United States Patent
Savage et al.

(10) Patent No.: US 9,021,090 B2
(45) Date of Patent: *Apr. 28, 2015

(54) NETWORK ACCESS FIREWALL

(75) Inventors: James A. Savage, San Jose, CA (US); Tim Bucher, Los Altos, CA (US)

(73) Assignee: Seagate Technology LLC, Cupertino, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 13/482,125

(22) Filed: May 29, 2012

(65) Prior Publication Data

US 2012/0233686 A1     Sep. 13, 2012

Related U.S. Application Data

(63) Continuation of application No. 11/030,449, filed on Jan. 6, 2005, now Pat. No. 8,214,481.

(60) Provisional application No. 60/543,235, filed on Feb. 10, 2004.

(51) Int. Cl.
*G06F 15/16* (2006.01)
*H04L 29/06* (2006.01)
*G06F 21/41* (2013.01)

(52) U.S. Cl.
CPC .............. *H04L 63/101* (2013.01); *G06F 21/41* (2013.01); *H04L 63/02* (2013.01); *H04L 63/08* (2013.01)

(58) Field of Classification Search
CPC ....... H04L 63/101; H04L 63/02; H04L 63/08; G06F 21/41
USPC .................. 709/224, 225; 726/11, 12, 13, 14
See application file for complete search history.

(56) References Cited

U.S. PATENT DOCUMENTS

| | | | |
|---|---|---|---|
| 6,233,618 B1 | 5/2001 | Shannon | |
| 6,470,025 B1 | 10/2002 | Wilson et al. | |
| 6,604,133 B2 | 8/2003 | Aggarwal et al. | |
| 7,042,988 B2 * | 5/2006 | Juitt et al. | 379/88.17 |
| 7,689,666 B2 * | 3/2010 | Commons | 709/217 |
| 2003/0087629 A1 | 5/2003 | Juitt et al. | |
| 2003/0123422 A1 | 7/2003 | Miya | |
| 2003/0182420 A1 | 9/2003 | Jones et al. | |
| 2004/0267929 A1 | 12/2004 | Xie | |

* cited by examiner

*Primary Examiner* — Krisna Lim
(74) *Attorney, Agent, or Firm* — HolzerIPLaw, PC

(57) ABSTRACT

The communications management systems manage access to a local area network or network content by external users, applications, and devices. The systems and methods are implemented on a network appliance to manage content within the network and facilitate content transmission through a firewall that separates the network from a larger networking environment, such as the World Wide Web.

19 Claims, 5 Drawing Sheets

NETWORK ACCESS FIREWALL

RELATED APPLICATIONS

This application is a continuation of U.S. Non-Provisional patent application Ser. No. 11/030,449, filed Jan. 6, 2005, U.S. Pat. No. 8,214,481, issued Jul. 3, 2012, and entitled "Firewall Permitting Access to Network based on Accessing Party Identity," which claims the benefit of U.S. Provisional Patent Application Ser. No. 60/543,235, filed Feb. 10, 2004, each of the '449 application and the '235 application is incorporated herein by reference in its entirety.

BACKGROUND OF THE INVENTION

1. The Field of the Invention

The present invention relates generally to content management. More particularly, embodiments of the present invention relate to systems and methods for controlling access to and from a network through a network appliance.

2. The Relevant Technology

Computer networks continue to proliferate due to declining costs, increasing performance of computer and networking equipment, and increasing demand for communication bandwidth. Client networks, including wide area networks ("WANs") and local area networks ("LANs"), allow increased productivity and utilization of distributed computers or stations through the sharing of resources, the transfer of data, and the processing of data at the most efficient locations.

Moreover, as organizations and individuals have recognized the economic benefits of using client networks, network applications such as electronic mail, voice and data transfer, host access, and shared and distributed databases, are increasingly used as a means to increase user productivity. This increased demand, together with the growing number of distributed computing resources, has resulted in a rapid expansion of the number of installed networks.

As a result of the widespread use of computing devices and computer networks, many businesses have experienced, and continue to experience, enormous growth in network content volume. This growth has led to a need has arisen for systems, devices and software configured to implement schemes that allow users to locate, access, share, back up, and otherwise manage, network content. A number of approaches have been devised in an attempt to fulfill the aforementioned needs. Such approaches have proven problematic for various reasons.

For example, some users have attempted to implement file-sharing and related functionality by using electronic mail, or "email," to transmit files to other users. However, sharing files in this way is problematic, at least because email software is generally not designed or intended for use in implementing file sharing schemes. For each content file or group of content files desired to be sent by email, the sender must specify in the email the name of each of the recipients to whom such content files will be sent. This approach to file sharing can be frustrating and time-consuming, particularly for users that frequently disseminate a variety of different content types to different groups of recipients. Moreover, attaching content files to an email can slow the operation of the email program and may, in some instances, result in corrupted or truncated content files.

Further, some content files are too large to be sent by email and so must be loaded on electronic media that is then physically transported to the intended recipient. Such manual processes are time-consuming, expensive, and unreliable, particularly where a large amount of content or a large number of files is desired to be transferred.

Yet other file-sharing schemes have been implemented in the form of servers and Internet-based storage sites. However, these types of systems and environments typically lack effective and reliable systems and software to search for and locate content. Such limited search capabilities compromise the ability of users to locate, access and share content. A further problem with the use of servers and Internet-based storage sites as a vehicle for implementation of file sharing schemes is that both servers and Internet storage sites can be quite expensive to purchase, use and maintain. Moreover, the storage capabilities of servers and Internet storage sites are typically rather limited. Content located at those sites may be vulnerable to hacking or other unauthorized access.

Not only does the proliferation of content have implications with respect to content backup procedures and file sharing, but it is often the case that users desire to be able to effectively and reliably access such content from remote locations. Various types of hardware and software have been devised to this end, but have not proven particularly effective in implementing such remote content access functionality.

By way of example, virtual private networks ("VPN") have been developed that essentially permit secure transmission of content over public communications networks, such as the Internet, thereby permitting VPN remote clients to access content located on an office network or device for example. While VPNs thus provide some useful functionality, the hardware and software necessary to implement the VPN is relatively expensive. Moreover, VPNs are often difficult to set up, configure and maintain. This is of particular concern for consumers in small to medium sized businesses, for example, that typically lack the sophisticated IT resources and personnel that are available to relatively larger business enterprises. For this reason, at least, VPNs often do not represent a viable avenue to implementation of remote content access.

In addition to VPNs, various types of software have been developed with a view toward facilitating remote content access. However, such software is typically limited to the use of PCs for implementing its functionality. Moreover, these software products can be difficult to install, configure and run.

In addition, systems for accessing and/or storing data remotely or between networks are subject to security risks. Thus, networks typically have one or more firewalls to prevent unauthorized access to or from a private network. For example, firewalls are frequently used to prevent unauthorized Internet users from accessing private networks connected to the Internet, especially intranets. All messages entering or leaving the intranet pass through the firewall, which examines each message and blocks those that do not meet the specified security criteria. Conventional firewalls operate as a user or remote device uses access information to gain access to the network as desired. Such approaches have the drawback, however, in that the firewall acts independently from the network and is controlled by the remote user. Hence, the remote user needs the proper applications and/or codes to pass through the firewall.

In view of the foregoing problems, and other problems in the art not specifically enumerated herein, what is needed are systems and methods that provide for effective and reliable content management enabling users to access data and or store data from remote locations without compromising security.

BRIEF SUMMARY OF THE INVENTION

These and other problems are addressed by embodiments of the present invention, which relate generally to systems and methods for managing communications between computing environments. More particularly, embodiments of the present invention relate to systems and methods for using a single computing device such as a network appliance to manage content within a network and facilitate content transmission through a firewall that separates the network from a larger networking environment, such as the World Wide Web.

The firewall in a network appliance may be configured to monitor network traffic external to the network appliance, preferably on a dedicated port, to identify authentication requests. The firewall performs an authentication procedure to validate the identity of the party requesting authorization and application on the network. Once that party is validated it can make requests, such as for access for a certain duration on a certain port. After access to the network is granted, applications on the appliance are able to control and terminate the access as desired. These methods enable users of the network appliances to conveniently grant access to a local network, which facilitates the remark access of data for substantially any purpose, including remote sharing and collaborating.

A network appliance according to the invention may serve as both a content management system and a firewall in a local area network. In one embodiment the appliance may also include each of the firewall, a policy engine having one or more rules, and a database having one or more data structures as part of the content management system. In one embodiment access to the network can be controlled via a comparison between the identity of an access requestor and the rules and data structures.

According to one embodiment of the invention, a method of establishing a relationship between a network appliance on a network and one or more other computing devices, users, or applications external to the network is performed in the network appliance to manage content in and access to a network. External traffic is monitored to identify a request to authenticate from a requestor seeking access to the network at a network appliance which coordinates content within the network and acts as a firewall between the network and external networks. Upon identifying a request to authenticate, an authentication procedure is performed to validate the identity of the access requestor as one having permission to access the network. A request is received or processed from the authenticated access requestor to have direct access to a portion of the network, and the access is granted if the requested access is within the authorized scope of access.

According to another exemplary embodiment of the invention, in a network appliance that manages content in and access to a network, a method is provided for establishing a relationship with one or more other network appliances, users, or applications external to the network. The network appliance includes a content management system, a firewall, a policy engine, and a database. The network appliance monitors traffic external to the network to identify a request to authenticate from a requestor seeking access to the network.

Upon identifying a request to authenticate, an identity authentication procedure is performed to validate the identity q as of the access requestor one having permission to access the network or content. The authentication procedure includes comparing an access requestor identity with one or more rules stored on the policy engine and/or one or more data structures stored on the database. Based upon the comparison between the access requestor's identity and the one or more rules and/or the one or more data structures, determining the permissible scope of access to the various devices, applications, and content on the network that the access requestor may be granted. Finally, access to the access requestor direct access to the permissible portion of the network or content is granted.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
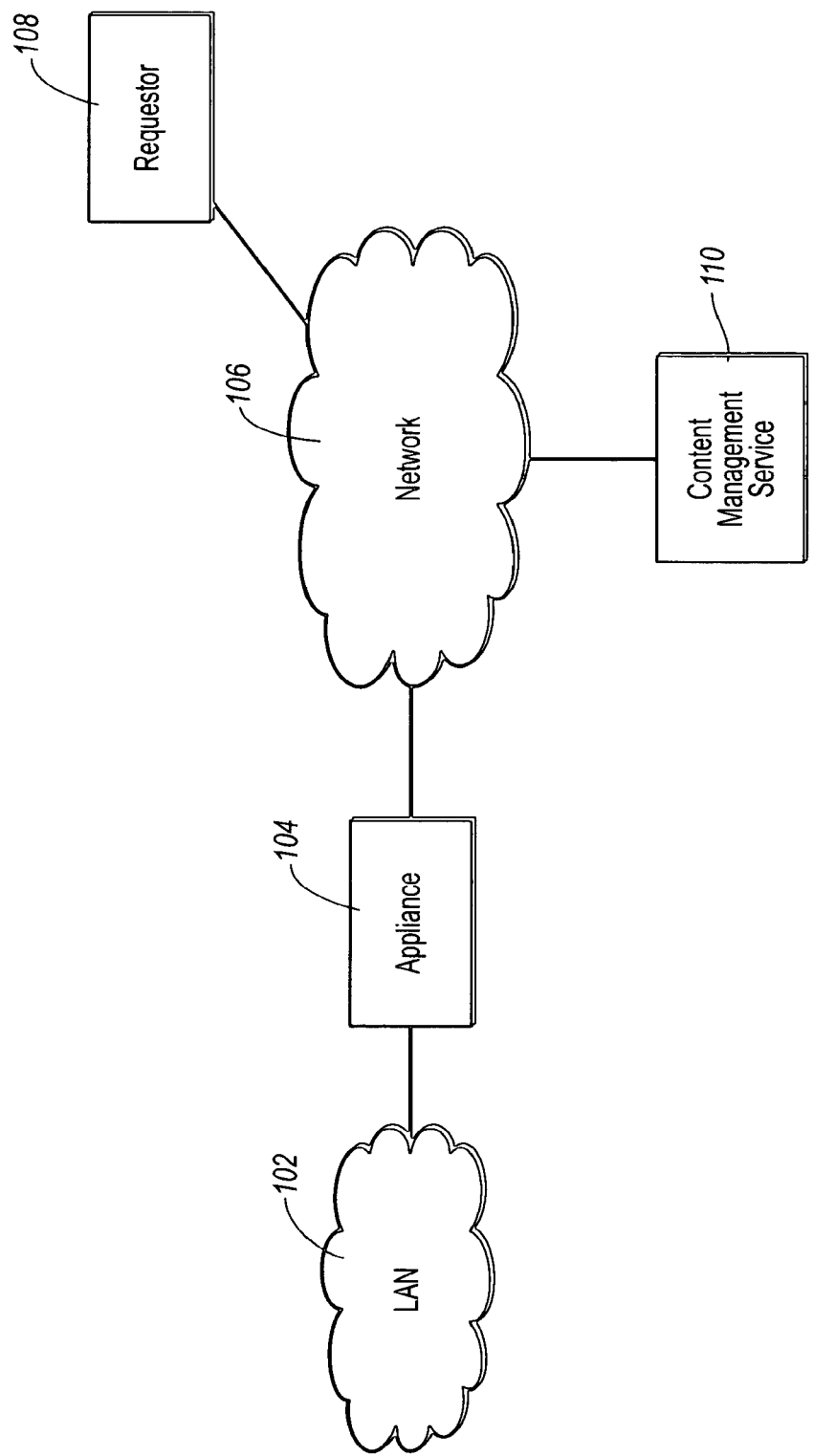
FIG. 1 illustrates an exemplary environment for implementing embodiments of the present invention.

Embodiments of the present invention relate generally to systems and methods for managing communications between computing environments. More particularly, embodiments of the invention relate to systems and methods for using a single device to manage access to content within a network and facilitate content transmission through a firewall that separates the network from a larger networking environment, such as the World Wide Web. As used herein, the term "content" includes, among other things, software, data, information, and any other electronic materials in conjunction with which it may be useful or desirable to employ embodiments of the invention.

In one embodiment, a network appliance serves as both a content management system and a firewall for a network, such as a local area network (LAN). Other applications operating on the network appliance or the LAN are connected to the firewall so that existing network identity schemes can be used by the applications to control gate access to and from the network, to and from applications that run on the network appliance, and/or to and from other applications that run on the LAN.

The firewall in the network appliance is configured to monitor network traffic external to the network appliance, preferably on a dedicated port, to identify authentication requests. The firewall performs an authentication procedure to validate that an authentication request is properly constructed and optionally to identify the identity of the party requesting authorization and access to content on the network. Once that party is validated by the firewall it can make requests, such as for access for a certain duration on a certain port. After passing the firewall to gain limited access to the network, the request is routed to applications on the appliance that are able to control and terminate the access as desired. The applications compare the requester's identity to known network identities, either stored on the appliance, on the LAN, or on a web-based service and thereby control or gate access to the network through the firewall. Advantageously, this enhances peer to peer file transfer as it may eliminate the need to use an external service to get around the firewall.

Reference will now be made to the drawings which illustrate various aspects of exemplary embodiments of the invention. It is to be understood that the drawings are diagrammatic and schematic representations of such exemplary embodiments, and are not limiting to the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of network systems and methods have not been described in particular detail in order to avoid unnecessarily obscuring the present invention.

Reference is first made to FIG. 1, which is a functional block diagram of a system for implementing embodiments of the invention. In the networked system, a local area network (LAN) 102 has an attached network appliance 104 that is used to monitor and control communications both within LAN 102 and between LAN 102 and network 106, as further described herein. While LAN 102 can be essentially any local area network, the invention is particularly well-suited to LANs that are established in a small-office network, a network, or a home office network. Network 106 may be, for example, the Internet, a wide area network (WAN), or any other network system as is commonly known or may be developed.

The depicted embodiment includes two of the typical devices external to the LAN 102 that may request access to, or receive access requests from, the LAN 102 via network appliance 104 and network 106. These are a remote access requestor 108 and a web-based content management service 110. The service 110 is a web-based service that is responsive to the requests of numerous remote users and devices, such as requestor 108 and LAN 102, and serves to coordinate communications between the remote devices and networks. The requestor 108, may be a remote user, such as an individual user of an employee, who typically operates within LAN 102 but is currently working at a remote location; a trusted third party who is granted access to LAN 102; a remote LAN, such as a remote office LAN in a corporation that has more than one office; or any another service or application that is seeking access to the LAN, for example to update its databases.

In one embodiment of the invention, the requestor 108 can gain access to LAN 102 by first accessing service 110 and indicating to the web-based service 110 that access to LAN 102 or network appliance 104 is desired. By the methods and devices discussed hereinbelow, the service 110 then enables the requestor 108 to be authenticated by and open communications with network appliance 104. Because service 110 is not needed to maintain the connection between the requestor 108 and the network appliance 104, it is removed from the communications path between the requestor 108 and the network appliance 104 so that a peer to peer connection between requestor 108 and network appliance 104 is maintained. In this manner, systems according to the invention advantageously minimize or eliminate the necessity of an open link between requestor 108 and service 110 that would otherwise consume resources on service 110.

In another embodiment, the requestor 108 may directly initiate a connection to appliance 104 in order to access LAN 102 in a peer to peer relationship. This is because the service 110 is not always required to open the connection between requestor 108 and network appliance 104. One advantage of the present invention is that this peer to peer relationship can be established when the appliance 104 is acting as a firewall. Thus, the appliance 104 permits access to the network 102 or to the resources of the network 102 based on the identity of the requestor 108. The present invention enables communication through the firewall in a secure manner by limiting the communication, for example, to a particular port, to a particular endpoint, for a particular time period, or other limited resources on the network 102. In addition, the applications available in the network 102 are firewall aware and can also have an impact on communication through the firewall. The applications, for example, may terminate access of the requestor 108 or limit access to pre-determined resources. In one embodiment, the appliance 104 stores rules or has access to rules that that can used to control or gate access to the LAN 102 and the resources of the LAN 102.

Figure 2:
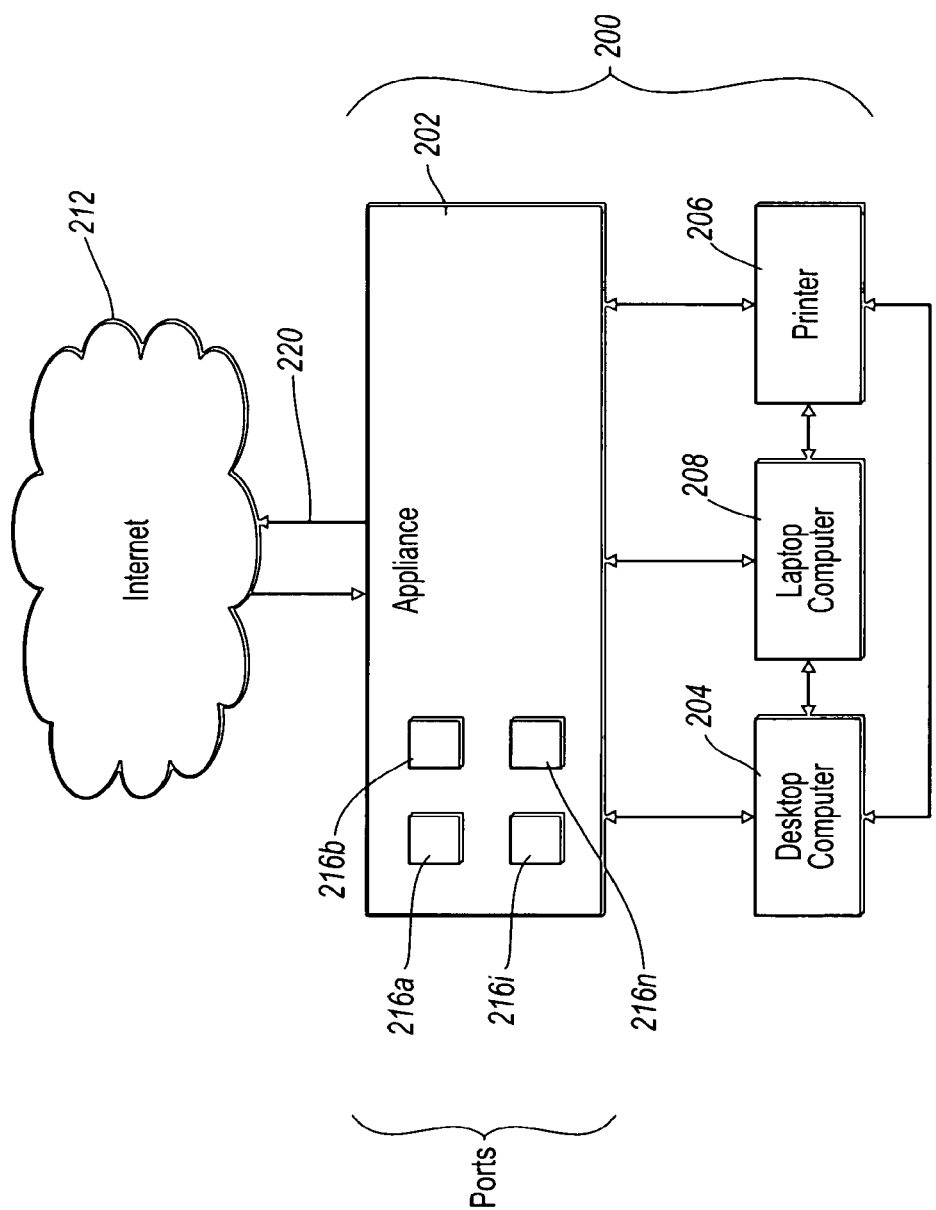
FIG. 2 illustrates one embodiment of a network appliance that includes a content management system and that functions as a firewall.

Reference is now made to FIG. 2, which illustrates a block diagram of a distributed appliance-based local area network (LAN), designated generally at 200. As depicted, the network 200 includes peripheral devices such as a computer 204, a printer 206, and a laptop computer 208 in communication with a network appliance 202. Of course, the network 200 may an arbitrary number of such devices. The network 200 may also include other peripheral electronic devices not discussed herein or depicted in FIG. 2 that are known in the art. As depicted by the various arrows in FIG. 2, the devices may be connected directly to appliance 202, directly to each other, and/or in a ring, depending upon the preferred design of the LAN. The network 200 may also be implemented, for example, as a wireless network. The appliance 202 may be connected or provide access to an external network, for example Internet 212.

A network appliance is a computer device that includes hardware devices and software modules. In this embodiment, network appliance 202 includes a processor (not depicted) that executes the routines in the software modules. In addition, for reasons that will be further enumerated in the discussion below related to FIG. 3, appliance 202 includes one or more ports 216*a-n*, including a dedicated port 216*a* that may be used to monitor network traffic originating outside network 200 in order to detect authentication requests from external devices desiring access to network 200.

An appliance based networking environment may utilize an appliance to perform one or more of various services for the computers in the network, such as by operating as an Internet gateway, by operating as a router to distribute data throughout the network, performing network interfacing, by providing redundant data storage services, and/or the like.

A gateway module, for example, distributes data between the peripheral computers connected to the appliance and the Internet. A router module distributes data between each of the peripheral computers connected to the appliance 202. A data storage module may store data from one or more of the peripheral computers onto a central data storage device. The data stored on the appliance can be used for any purpose such as backup, expansion, or collaboration, both within the local network illustrated in FIG. 2 and within a large area network that includes remote computers connected to the appliance via the Internet. A network interfacing module of the appliance 202 enables the appliance 202 to exchange data with the peripheral devices connected to the appliance. In addition, a content management system may also reside on the appliance 202.

In addition to the firewall capabilities and the other features discussed herein, the network appliances may be otherwise similar to and include features of the network appliances disclosed in U.S. Provisional Patent Application Ser. No. 60/502,746, entitled "Seamless Scaling of Multiple Appliances," filed Sep. 12, 2003, which is incorporated herein by reference.

Figure 3:
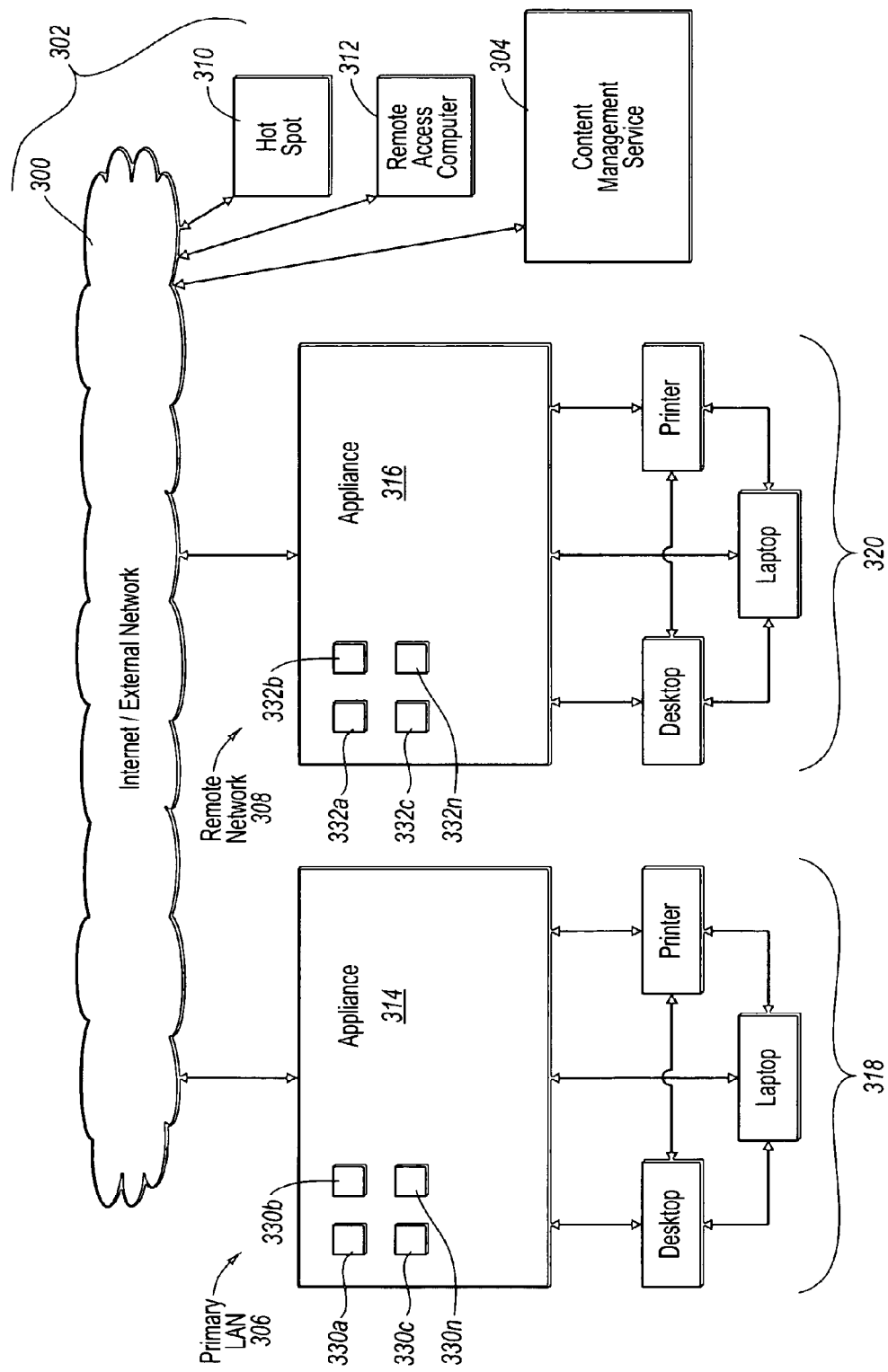
FIG. 3 is another schematic diagram that illustrates aspects of an exemplary computer network operating environment suitable for embodiments of the invention.

Directing attention now to FIG. 3, details are presented concerning a content management system implemented over various devices connected by the Internet or an external network, denoted generally at 300. As can be seen, embodiments of the invention are readily scalable for implementation in operating environments that may vary widely in size and scope.

In the illustrated embodiment, the content management system is implemented in a client-website computing environment 302. In general, the client-website computing environment 302 includes a content management service website 304 configured for communication with a variety of clients such as a main office LAN 306, a home/remote office network 308, a "hotspot" 310, and a computer 312 configured for remote access.

Both the primary LAN 306 and remote network 308 include corresponding appliances 314 and 316, respectively, which are configured to include, or otherwise implement, functionality concerning the content management system. Generally, such appliances may include any system or device capable of implementing the functionality disclosed herein respecting appliances such as appliances 314 and 316. In this exemplary configuration, appliances 314 and 316 are generally configured to implement such functionality with respect to various devices in their respective local operating environments such as, respectively, computing devices 318 and 320.

As noted above, an additional client of the content management service comprises a hotspot 310. In general, for users of portable computers equipped for wireless, a hot spot is a location providing Internet connection and virtual private network access from a given location. For example, a business traveler with a laptop equipped for Wi-Fi can look up a local hot spot (access point), contact it, and get connected through its network to reach the Internet and access a remote network via a secure connection. Alternatively, as used herein a hotspot 310 may denote any of various devices through which content can be viewed or accessed, such as in a read-only mode. The hotspot 310 may include locally stored content and/or may simply operate as a "window" on content stored at the content management service website 304. Yet another exemplary client of the content management service comprises a computer 312 that is configured for remote access to the content management service, either by way of a hardwire or wireless connection.

Various aspects of content management may be distributed among the content management service 304 and one or more of the associated clients. By way of example, the appliance 314 may be configured to receive data from the content management service 304 and synchronize the received data on the various devices that comprise the main office LAN 306. The same arrangement may likewise be implemented with respect to the home/remote office network 308.

Thus, each of the clients is configured to implement, by way of their respective appliances, certain content management functionalities concerning only their associated devices. Accordingly, the overall synchronization of content among all of the may be implemented by way of the content management service 304. In this way, content changes or other events occurring within, for example, primary LAN 306 can be reflected, by operation of the content management service 304, at other clients such as computer 312, hotspot 310, and remote network 308.

The services provided and implemented by way of the content management service 304 may be provided on a fee basis. A fee structure may be configured to correspond to, among other things, the number of files transmitted between a client and the content management service, the bandwidth employed by a client, the number of devices associated with a client, or any other suitable parameters.

One aspect of the arrangement illustrated in FIG. 3 is that overall control of the content management needs of multiple clients associated with a particular local area network, such as one operated by a home user or a small-office of home office user, can be coordinated through a central website, without necessitating the use, implementation or maintenance, by that network user, of an expensive and complex central management system. Such an arrangement also provides a level of security to the revenue stream realized by the operator of the content management service, as the potential costs to the client associated with a severance of the relation with the content management service may be significant and would likely exceed the costs associated with maintenance of that relation.

Yet another advantage of the configuration illustrated in FIG. 3 relates to computer 312, through which remote access to data associated with one or more related clients of the content management service is achieved. In particular, a user desiring to access data contained, for example, on main office LAN 306 can readily do so by simply connecting computer 312 with the content management service website 304, at which time various content management operations may be performed. Consequently, any number of remote users can readily avail themselves of desired content and content management functionality. Such a feature may prove particularly useful, for example, in the case of businesses and other enterprises that have employees who frequently travel away from the home office and rely on remote access to content. This feature is also particularly useful to home users who can grant access to local data to trusted third-part users, such as friends or family.

In one such content management operation, the content management service 304 automatically updates the content detected on the remotely connecting computer 312. Similarly, in the event that hotspot 310 is located at a remote location, a user employing hotspot 310 to access and view content can be assured that the accessed content reflects the most up to date content available from the other related clients.

Figure 4:
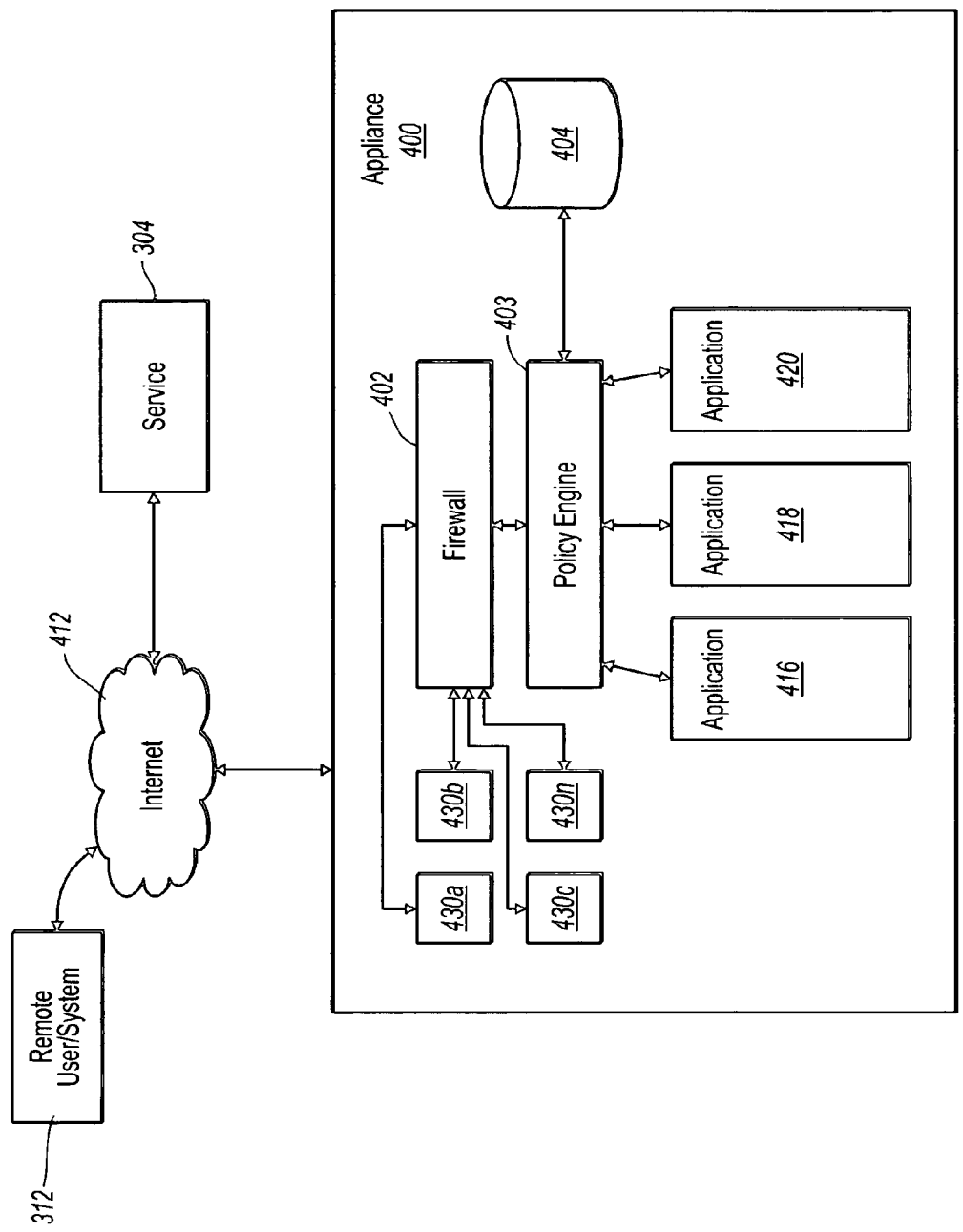
FIG. 4 is another schematic diagram that illustrates aspects of a network appliance according to embodiments of the invention.

Directing attention now to FIG. 4, various details are provided concerning aspects of an embodiment of a network appliance, denoted generally at 400. In the illustrated embodiment, the appliance 400 includes a firewall 402 in communication with, or otherwise associated with, one or more ports 430a-n, a policy engine 403, a corresponding database 404, and one or more applications 422, 424, 426 that serve various functions on the appliance for an associated LAN. While the firewall 402, policy engine 403, database 404, and applications 422, 424, 426 are illustrated as being discrete elements of appliance 400, one or more of the firewall 402, policy engine 403, database 404, and applications 422, 424, 426 may, in other embodiments, collectively be a single element. Accordingly, the embodiment presented in FIG. 4 is for illustrative purposes only and is not intended to limit the scope of the invention in any way.

Moreover, the functionality afforded by each of firewall 402 and policy engine 403, as disclosed herein, may be implemented in various ways and with various systems and devices. Similarly, database 404 may include any type of database and/or database structures suitable in facilitating implementation of the functionality disclosed herein. Consistent with the foregoing, any other systems, methods, devices, and/or software effective in implementing some or all of the functionality of appliance 400 may alternatively be employed, and the scope of the invention should not be construed to be limited to any particular implementation.

The policy engine 403 includes, or is configured to access, various policies, or rules, concerning management of content that is related to the environment wherein the appliance 400 is employed, or with which the appliance 400 is otherwise associated. As evidenced by the present disclosure, there is virtually no limit to the type, number and content of content management rules that can be defined. Likewise, the type and number of actions that can implemented is virtually unlimited. By way of example, such rules may take the form: "In the event a remote access requestor requests access to data managed by application 416, verify identity of requestor with application 416" or "In the event content is received at the appliance 400 from computer 'A,' copy and download such content to database 404 'W.'" More generally however, any other rules may be defined that serve to implement some or all aspects of the functionality disclosed herein.

In connection with the foregoing it should be noted that in some embodiments of the invention, some or all aspects of the rules may, instead of being centrally deposited in the policy engine 403, be included or otherwise implemented within metadata profiles associated with the various files or content with which the appliance 400 is concerned. The actions specified by the rules in the applicable metadata profiles could then be implemented by the policy engine 403 with respect to the associated content. As suggested by the foregoing, the inclusion of the rules in a policy engine 403 is but one exemplary implementation and, more generally, the rules may be constructed and implemented in any other way consistent with the functionality disclosed herein. In addition, the one or more applications 416, 418, 420 resident on the appliance 400 also include affiliated data structures having rules to coordinate content management. Hence, the policy engine 403 has a large variety of locations from which it may access rules to coordinate content management and access to a network.

The rules are, in at least some instances, defined with reference to particular content. Each of the database structures typically has data, or a file, as well as various types of metadata concerning the data, or file, portion of the data structure. Moreover, the database 404 may be configured so that one or more of such data structures, or other content, can be imported to, and/or exported from, the database 404.

Thus, one aspect of the aforementioned relationships is that the policy engine 403, guided by the requirements specified in one more rules, is effective in implementing various desired content management operations with respect to one or more of the data structures contained in the databases 404, 422, 424, 426. Additionally, or alternatively, the policy engine 403 may, consistent with certain rules, implement various desired operations with respect to one or more data structures located other than in database 404.

Moreover, rules are not constrained for use solely with reference to specific content but may, more generally, be implemented at a variety of different levels. For example, rules may be defined that are configured for implementation of various content management actions at a folder level, a computer level, a user level, a user group level, a computing environment level, or any other desired level in a given hierarchy.

Additional details regarding rules and policy-engines that can be used with the present invention are disclosed in Provisional U.S. Patent Application Ser. No. 60/491,449, entitled "Rule-Based Content Management System," filed Jul. 31, 2003, which is incorporated herein by reference.

As previously mentioned, firewall 402 is in communication with each of policy engine 403 and ports 430*a*-*n*. Firewall 402 monitors network traffic, for example through port 430*a*, to identify requests to authenticate a remote computer, application, or user on the network associated with firewall 402. A firewall is generally defined as a system designed to prevent unauthorized access to or from a private network. Firewalls can be implemented in both hardware and software, or a combination of both. For example, firewalls are frequently used to prevent unauthorized remote Internet users from accessing private networks connected to the Internet. All messages entering or leaving the local network pass through the firewall, which examines each message and blocks those that do not meet the specified security criteria. In the present case, firewall 402 prevents access to the associated network by anyone who has not had his identity authenticated by the firewall and/or applications 416, 418, or 420 and been granted access.

Upon identifying a request to authenticate from a party requesting access, an authentication is performed to validate the identity of the access requestor. While any process for authenticating identify may be implemented and is within the scope of the invention, one non-limiting example is provided in FIG. 4. In FIG. 4, firewall 402, upon receiving a request to authenticate identity, passes the request to policy engine 403. Policy engine 403 may apply rules and compares data structures 408 to identify whether the identity of the requestor is known and approved. Alternatively, policy engine 403 may access one or more of applications 416, 418, and 420 to receive authentication verification from the applications. Thus, the same process used to enable access for a user to the network, or portions of the network, from within the network can also be used to gain access through firewall 402. More particularly, a requestor may be granted access to selected information on the appliance, selected applications on the appliance, or all or part of other computers and devices on the network. Thus the rules and data structures 408 control a remote user's access in the same manner it controls a local user's access.

In one embodiment the remote access requestor may request access for a given or defined duration on a dedicated port on the appliance to one or more of applications 416, 418, 420. Thus, the applications can directly controls the duration and scope of the gate access provided through firewall 402 to the network. Hence, whereas one who requests remote access conventionally provides the information and control necessary to gain access through, and terminate access through, a firewall, embodiments of the invention place that control within the applications or content management systems within the network or on the appliance.

Access to and from the local area network may be implemented with or without a web-based content management service such as content management service 304. Authentication requests from a remote user or system can thus be made either through the content management service 304 on the Web, or directly to a network appliance configured for content, such as appliance 400, if the access requestor knows the correct address or other means used to locate the appliance.

Regardless of whether the connection between the network appliance and the access requestor is initially routed through service 304, after access is granted to the access requestor, content transfer may occur directly between the access requestor and the appliance in peer to peer data transfer in order to avoid unnecessarily occupying resources on content management service 304. In various embodiments, the appliance will select one of various ports (i.e. ports 430a-n) to use as a designated port for access to and from the access requestor. In this manner access can be more easily facilitated and controlled. Any desired encryption or security mechanisms such as public key/private key encryption, or other methods generally known in the art of that may be developed in the future may be used with the communication of data through firewall 402.

Figure 5:
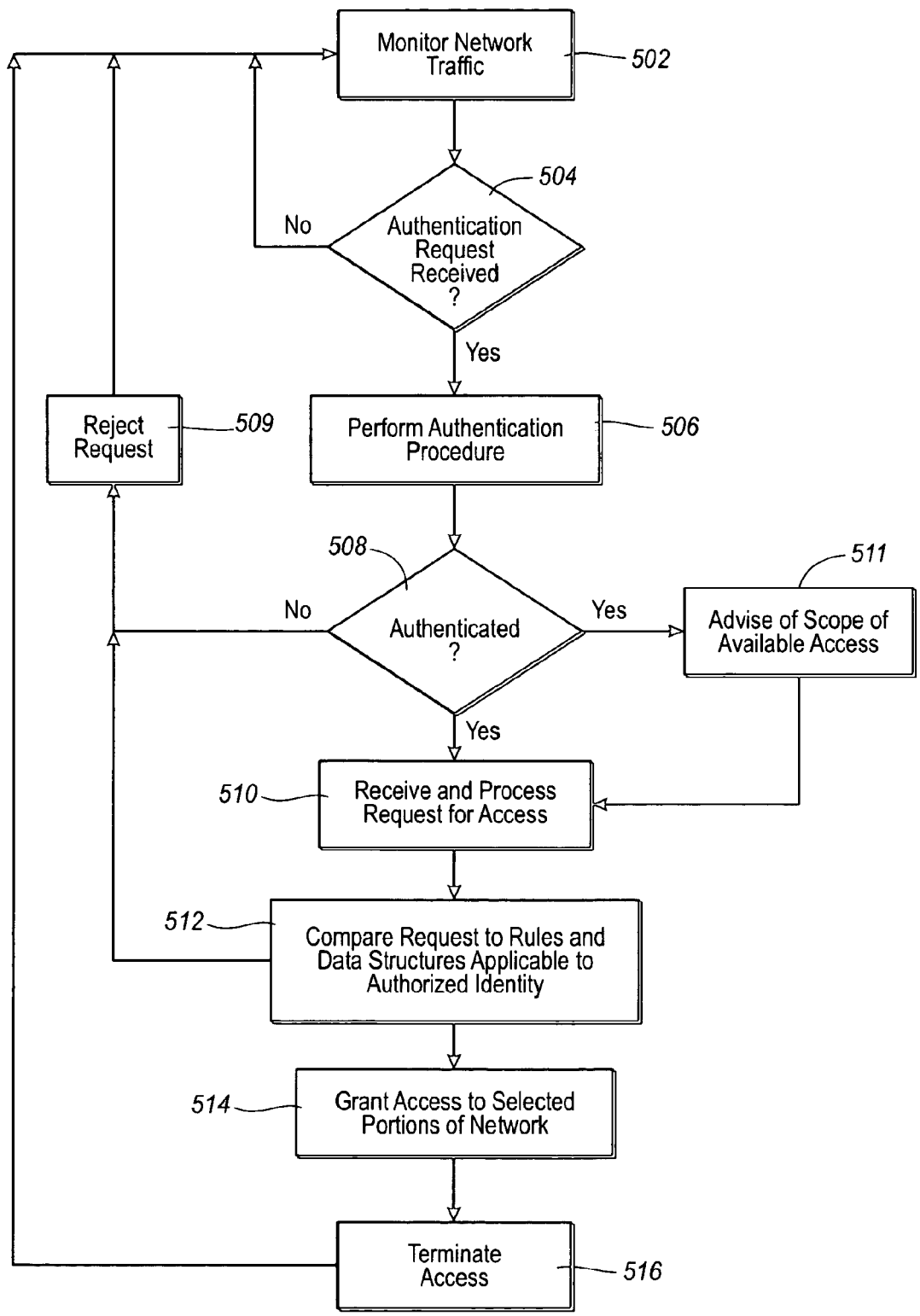
FIG. 5 is a flow diagram that illustrates aspects of an exemplary implementation of the invention.

Referring now to FIG. 5, the depicted block diagram illustrates one method of implementing firewall 402 in the system depicted in FIGS. 1-4 to control access to and from a local area network. Initially, firewall 402 monitors network traffic via dedicated port 410 on an appliance, such as appliances 314, 316, as indicated by step 502. Network traffic may be received from a service, such as service 304, or form other sources on the World Wide Web or other network. The network traffic is monitored in order to detect identity authorization requests from remote users or devices, such as home/remote access appliance 316, remote access computer 312, and/or hot spot 310.

As network traffic is monitored, firewall 402 determines whether an identity authorization request has been received, as indicated by decision block 504. If not, monitoring of network traffic continues. If an identity authorization request is received, then the method progresses to step 506 to begin the authentication procedure, as described hereinabove or otherwise known in the art. Of course, it will be appreciated that monitoring of network traffic does not cease merely because one authentication request is received. Rather, monitoring network traffic is a continuous process as multiple remote access requestors may request and be granted access at the same time.

Firewall 402 next inquires whether the identity of the access requestor has been authenticated, as indicated by decision block 508. If not the authentication request is rejected in step 509 and the process is returned to monitoring network traffic in step 502. The request may be rejected either by advising the access requestor of the rejection or merely failing to provide the access.

If the identity is authenticated, firewall 402 optionally advises the access requestor that the identity has been authenticated and advises the access requestor of the available scope of access, as indicated by step 511. The firewall then receives a request for access to the appliance or the network. The specifics of the request may come after the access requestor is advised of the authentication or simultaneously with the request for identity authentication. The request may include, for example, requests for access to a dedicated port on the network, requests for selected duration of access, and/or requests for access to specific applications and/or databases on the network appliance or other devices in the network. The policy engine and/or relevant applications compare the request to the applicable rules and data structures to determine if the request is within the scope of the identity's authorized access, as indicated by decision block 512. If it is, then access is granted, as indicated by step 514. If not, the request is rejected, as indicated by step 509, and the process starts over. Finally, access through the firewall to the network may be terminated either by the appliance or by the access requestor.

Of course, other steps may be included in methods according to the invention. For example, a user that has an authorized identity may be advised of the range of access that is available so that the access requests can be properly tailored.

Embodiments of the content management system may be implemented within a variety of different environments. In particular, embodiments of the present invention may be implemented with a special purpose or general purpose computer or other computing device which may or may not comprise a portion of a computer network. A network appliance is an example a computing device. As discussed in greater detail below, such a general purpose computer exemplarily includes various computer hardware. Exemplary embodiments of the present invention also comprise computer-readable media for carrying or having computer-executable instructions or electronic content structures, such as data structures, stored thereon.

Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or electronic content structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, or special purpose local processing device to perform a certain function or group of functions.

The following discussion provides a brief, general description of an exemplary computing environment in which the invention may be implemented. Although not required, aspects of the invention may be described in the general context of computer-executable instructions, such as program modules, being executed by computers in network environments.

Generally, program modules include routines, programs, objects, components, and content structures that perform particular tasks or implement particular abstract content types. Computer-executable instructions, associated content structures, and program modules represent examples of the program code means for executing steps of the methods disclosed herein. The particular sequence of such executable instructions or associated content structures represent examples of corresponding acts for implementing the functions described in such steps.

Of course, the invention may be practiced in network computing environments with many types of computer system configurations, including personal computers, hand-held devices, multi-processor systems, microprocessor-based or an programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a client network. In a distributed computing environment for example, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   monitoring traffic external to a network to identify a request to authenticate from an access requestor seeking access to the network;
   comparing, at a network appliance comprising a firewall and a policy engine, an identity of the access requestor with one or both of rules and data structures stored on the network appliance; and
   determining, based upon the comparison, a permissible scope of access that the access requestor may be granted to various devices, applications, and databases on a network.

2. The method of claim 1, further comprising granting to the access requestor access to a permissible portion of the network within the permissible scope of access.

3. The method of claim 1, further comprising monitoring traffic external to the network to identify a request to authenticate from a requestor seeking access to the network.

4. The method of claim 3, further comprising performing an identity authentication procedure to validate the identity of the access requestor as one having permission to access the network.

5. The method of claim 3, wherein the network appliance further comprises an application and the rules and data structures are stored in a database associated with the application.

6. The method of claim 3, wherein the request to authenticate is delivered to the network appliance from the access requestor via a web-based service.

7. The method of claim 6, wherein the access from the access requestor to the network does not pass through the web-based service.

8. The method of claim 2, wherein granting the access requestor access to a permissible portion of the network comprises granting access to one or more applications on the network appliance or on other computing devices in the network.

9. The method of claim 1, further comprising monitoring incoming traffic at the network appliance for an access request from the access requestor.

10. The method of claim 9, further comprising verifying the identity of the access requestor based upon comparison between the identity of the access requestor and the one or both of rules and data structures stored on the network appliance.

11. The method of claim 10, wherein monitoring incoming traffic for the access request from the access requestor further comprises at least one of:
   receiving the access request directly from an application;
   receiving the access request directly from a remote user; and
   receiving the access request directly from a service.

12. The method of claim 11, wherein verifying the identity of the requestor further comprises at least one of:
   verifying the identity of the access requestor through the service; and
   verifying the identity of the access requestor using a key exchange.

13. The method of claim 1, further comprising making applications on the network aware of the firewall such that the applications can enforce the permissible scope of access of the access requestor to the network.

14. A system, comprising:
   a network appliance comprising a firewall, a policy engine, and a database, the network appliance configured to monitor traffic external to a network to identify a request to authenticate from an access requestor seeking access to the network and store one or both of rules and data structures specifying permissible scope of access for an access requestor to various devices, applications, and databases on the network; and
   an authenticating apparatus configured to compare an access requestor identity with the one or both of rules and data structures stored on the network appliance and to determine based on the comparison, a permissible scope of access that the access requestor may be granted to various devices, applications, and databases on the network.

15. The system of claim 14, wherein the network appliance further comprises an application and the rules and data structures are stored in a database associated with the application.

16. A system comprising:
   a network appliance comprising a firewall and a database, the network appliance configured to monitor traffic external to a network to identify a request to authenticate from an access requestor seeking access to the network and store one or both of rules and data structures specifying permissible scope of access for the access requestor to various devices, applications, and databases on the network; and
   an authenticating apparatus configured to compare an access requestor identity with the one or both of rules and data structures stored on the network appliance and to determine based on the comparison, a permissible scope of access that the access requestor may be granted to various devices, applications, and databases on the network, the authenticating apparatus further configured to identify the request from the access requestor to have access to a selected portion of the network for a designated period of time on a dedicated port.

17. The system of claim 16, wherein the network appliance is further configured to grant access to the access requestor on the dedicated port for the designated time period.

18. The system of claim 14, wherein the authenticating apparatus is further configured to grant access to the access requestor to one or more applications on the network appliance and/or on other computing devices in the network based on the comparison.

19. The system of claim 14, wherein the network appliance is further configured to make applications on the network aware of the firewall such that the applications can enforce the permissible scope of access of the access requestor to the network.

* * * * *